US012720116B2

(12) United States Patent
Wang

(10) Patent No.: US 12,720,116 B2
(45) Date of Patent: Aug. 25, 2026

(54) SIGNALING OF PICTURE-IN-PICTURE IN MEDIA FILES

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/942,138

(22) Filed: Nov. 8, 2024

(65) Prior Publication Data

US 2025/0071332 A1 Feb. 27, 2025

Related U.S. Application Data

(63) Continuation of application No. PCT/US2023/021457, filed on May 9, 2023.

(60) Provisional application No. 63/339,676, filed on May 9, 2022.

(51) Int. Cl.

*H04N 19/70* (2014.01)
*H04N 19/136* (2014.01)
*H04N 19/169* (2014.01)

(52) U.S. Cl.

CPC ........... *H04N 19/70* (2014.11); *H04N 19/136* (2014.11); *H04N 19/188* (2014.11)

(58) Field of Classification Search

CPC .... H04N 19/70; H04N 19/136; H04N 19/188; H04N 21/85406; H04N 21/816; H04N 19/12; H04N 19/17; H04N 21/234336; H04N 21/23605; H04N 21/4316

USPC .................................................... 375/240.02

See application file for complete search history.

(56) References Cited

U.S. PATENT DOCUMENTS

2017/0339415 A1* 11/2017 Wang ...................... H04L 65/70
2018/0278971 A1* 9/2018 Wang ................ H04N 21/2353
2021/0092449 A1* 3/2021 Chang ................. H04N 19/167
2022/0070495 A1* 3/2022 Wang .................. H04N 19/184
2022/0086386 A1* 3/2022 Wang .................. H04N 19/172
2022/0086387 A1 3/2022 Wang
2022/0086431 A1* 3/2022 Wang ....................... H04N 7/01
2022/0086497 A1* 3/2022 Wang ....................... H04N 7/01
2022/0109861 A1 4/2022 Hannuksela et al.
2023/0019913 A1* 1/2023 Wang .............. H04N 21/23439
2024/0205429 A1* 6/2024 Hendry ............... H04N 21/845

FOREIGN PATENT DOCUMENTS

WO 2023203423 A1 10/2023

OTHER PUBLICATIONS

Li et al., "A fast H.264-based picture-in-picture (PIP) transcoder," 2004 IEEE International Conference on Multimedia and Expo (ICME) (IEEE Cat. No. 04TH8763), Taipei, Taiwan, 2004, pp. 1691-1694 vol. 3, doi: 10.1109/ICME.2004.1394578. (Year: 2004).*

(Continued)

*Primary Examiner* — Marnie A Matt

(74) *Attorney, Agent, or Firm* — Conley Rose, P.C.

(57) ABSTRACT

A mechanism for processing video data is disclosed. A type for a value taken by a region identifier (ID) in a region identifier (ID) type field (region_id_type) is determined. The type for the value taken by the region ID is coded in the region ID type field using four or less bits. A conversion between the visual media data and a media data file is performed based on the type for the value taken by the region ID in the region ID type field.

20 Claims, 7 Drawing Sheets

(56) References Cited

OTHER PUBLICATIONS

ITU-T and ISO/IEC, "Series H: Audiovisual and multimedia systems Infrastructure of audiovisual services—Coding of moving video High efficiency video coding," Rec. ITU-T H.265 | ISO/IEC 23008-2 (in force edition), Jul. 2024, 728 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13- 21, 2017, 50 pages.
Rec. ITU-T H.266 | ISO/IEC 23090-3, "Series H: Audiovisual and Multimedia Systems Infrastructure of audiovisual services—Coding of moving video Versatile video coding," Aug. 2020, 516 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
Rec. ITU-T Rec. H.274 | ISO/IEC 23002-7, "Series H: Audiovisual and Multimedia Systems Infrastructure of audiovisual services—Coding of moving video Versatile supplemental enhancement information messages for coded video bitstreams," Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.
ISO/IEC 14496-12: "Information technology—Coding of audio-visual objects—Part 12: ISO base media file format," Sixth edition, Dec. 2020, 15 pages.
ISO/IEC 23009-1: "Information technology—Dynamic adaptive streaming over http (dash)—Part 1: Media presentation description and segment formats". The 4th edition text of the DASH standard specification can be found in MPEG input document m52458, Jan. 5, 2012, 133 pages.
ISO/IEC 14496-15: "Information technology—Coding of audio-visual objects—Part 15: Carriage of network abstraction layer (NAL) unit structured video in the ISO base media file format," 2020, 15 pages.
ISO/IEC 23008-12: "Information technology—High efficiency coding and media delivery in heterogeneous environments—Part 12: Image File Format" First Edition Dec. 2017, 12 pages.
Sreedhar, K., et al., "(5.1)[14496-12] On picture-in-picture signalling in ISOBMFF", MPEG input document ISO/IEC JTC 1/SC 29/WG m59497v1, Apr. 2022, 3 pages.
International Search Report from PCT Application No. PCT/US2023/021457 dated Aug. 4, 2023, 13 pages.
Extended European Search Report for European Application No. 23804103.2, mailed May 8, 2025, 8 pages.
"Technologies under Consideration for ISOBMF Format," MPEG Meeting (MPEG or ISO/IEC JTC1/SC29/WG11), No. n21156 Feb. 2022, 61 Pages.
Wang Y-K., "On Picture-in-picture Signalling in ISOBMFF", 37. MPEG Meeting(Motion Picture Expert Group or ISO/IEC JTC1/SC29/WG11), No. m58905 Jan. 12, 2022, 5 Pages.
Wang Y-K., "Picture-in-picture Support in File Format", 136. MPEG Meeting (MPEG or ISO/IEC JTC1/SC29/ WG11), H04N , No. m57985 Oct. 4, 2021, 4 Pages.
Japanese Office Action from Japanese Patent Application No. 2024-566344 dated Jan. 6, 2026, 6 pages.

* cited by examiner

Determine a value of a region identifier type (region_id_type), where the value of the region identifier type equal to zero specifies that region identifiers (IDs) are versatile video coding (VVC) subpicture IDs when a video codec used to code a main video track and a picture-in-picture (PiP) video track is VVC

4202

Perform a conversion between a visual media data and the media data file based on the value of the region identifier type

Determine a value of a number of region identifiers, wherein the value of the number of region identifiers is constrained to being greater than zero

4222

Perform a conversion between a visual media data and the media data file based on the value of the number of region identifiers

Determine a value of a region identifier type (region_id_type), wherein the value of the region identifier type equal to zero specifies that region identifiers (IDs) are versatile video coding (VVC) subpicture IDs when a video codec used to code a main video track and a picture-in-picture (PiP) video track is VVC

4242

Perform a conversion between a visual media data and the media data file based on the value of the region identifier type

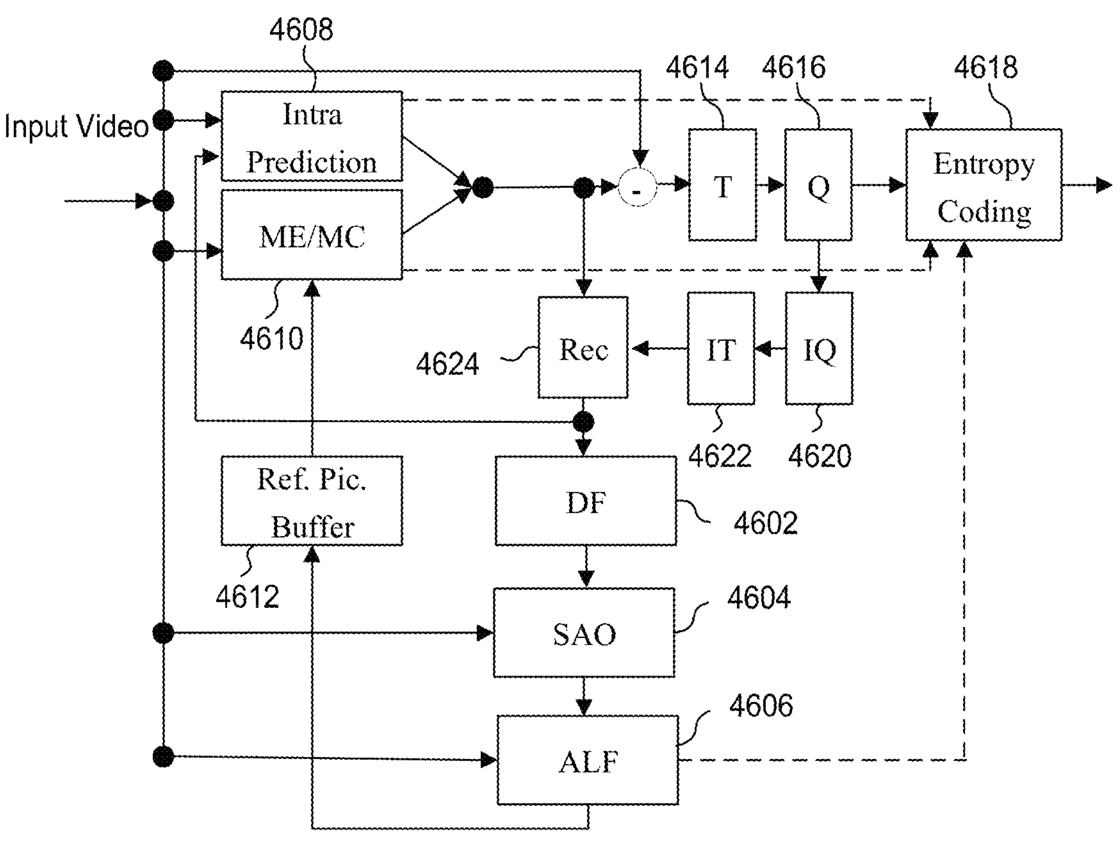
FIG. 9

SIGNALING OF PICTURE-IN-PICTURE IN MEDIA FILES

CROSS-REFERENCE TO RELATED APPLICATIONS

This application is a continuation of International Patent Application No. PCT/US2023/021457, filed on May 9, 2023, which claims the priority to and benefits of U.S. Patent Application No. 63/339,676, filed on May 9, 2022. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data, comprising: determining a value of a region identifier (ID) type (region_id_type) in a region identifier (ID) type field, wherein the value of the region ID type is coded in the region ID type field using four or less bits; and performing a conversion between a visual media data and a media data file based on the value of the region ID type in the region ID type field.

Optionally, in any of the preceding aspects, another implementation of the aspect provides that a remaining group of four or more bits in the region ID type field is reserved.

Optionally, in any of the preceding aspects, another implementation of the aspect provides that the region ID type equal to zero specifies that region IDs are versatile video coding (VVC) subpicture IDs.

Optionally, in any of the preceding aspects, another implementation of the aspect provides that the region ID type indicates a type for a value taken by a region ID.

Optionally, in any of the preceding aspects, another implementation of the aspect provides that the region ID is used for signaling of picture-in-picture in International Organization for Standardization base media file format (ISOBMFF).

Optionally, in any of the preceding aspects, another implementation of the aspect provides that the media data file comprises an International Organization for Standardization base media file format (ISOBMFF).

A second aspect relates to a method for processing video data, comprising: determining a value of a number of region identifiers, wherein the value of the number of region identifiers is constrained to being greater than zero; and performing a conversion between a visual media data and a media data file based on the value of the number of region identifiers.

Optionally, in any of the preceding aspects, another implementation of the aspect provides that the number of region identifiers is expressed as a number of region identifiers minus one (num_region_ids_minus1).

Optionally, in any of the preceding aspects, another implementation of the aspect provides that the num_region_ids_minus1 plus one specifies a region identifier (region_id[i]).

Optionally, in any of the preceding aspects, another implementation of the aspect provides that the region identifier specifies an i-th ID for coded video data units representing a target picture-in-picture region.

Optionally, in any of the preceding aspects, another implementation of the aspect provides that the region identifier is determined according to a loop specified by for (i=0; i<=num_region_ids_minus1; i++).

Optionally, in any of the preceding aspects, another implementation of the aspect provides that the number of region identifiers is expressed as num_region_ids.

Optionally, in any of the preceding aspects, another implementation of the aspect provides that the number of region identifiers is expressed as num_region_ids_minus1.

A third aspect relates to a method for processing video data, comprising: determining a value of a region identifier type (region_id_type), wherein the value of the region identifier type equal to zero specifies that region identifiers (IDs) are versatile video coding (VVC) subpicture IDs when a video codec used to code a main video track and a picture-in-picture (PiP) video track is VVC; and performing a conversion between a visual media data and a media data file based on the value of the region identifier type.

Optionally, in any of the preceding aspects, another implementation of the aspect provides that the value of the region ID type equal to zero is reserved when a video codec for a main video track is not VVC.

Optionally, in any of the preceding aspects, another implementation of the aspect provides that the value of the region ID type equal to zero is reserved when a video codec used to code a main video track and a picture-in-picture video track is not VVC.

Optionally, in any of the preceding aspects, another implementation of the aspect provides that a sample entry type is vvc1, vvi1, or vvs1 when a video codec used for a main video track is VVC.

A fourth aspect relates to an apparatus for processing video data comprising: a processor; and a non-transitory memory with instructions thereon, wherein the instructions upon execution by the processor, cause the processor to perform any of the preceding aspects.

A fifth aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A sixth aspect relates to a non-transitory computer-readable recording medium storing a bitstream of a video which is generated by a method performed by a video processing apparatus, wherein the method comprises: determining a value of a region identifier (ID) type (region_id_type) in a region identifier (ID) type field, wherein the value of the region ID type is coded in the region ID type field using four or less bits; and performing a conversion between a visual media data and a media data file based on the value of the region ID type in the region ID type field.

A seventh aspect relates to a method for storing bitstream of a video, comprising: determining a value of a region identifier (ID) type (region_id_type) in a region identifier (ID) type field, wherein the value of the region ID type is coded in the region ID type field using four or less bits; generating a bitstream based on the determining; and storing the bitstream in a non-transitory computer-readable recording medium.

An eighth aspect relates to a non-transitory computer-readable recording medium storing a bitstream of a video which is generated by a method performed by a video processing apparatus, wherein the method comprises: determining a value of a number of region identifiers, wherein the value of the number of region identifiers is constrained to being greater than zero; and performing a conversion between a visual media data and a media data file based on the value of the number of region identifiers.

A ninth aspect relates to a method for storing bitstream of a video, comprising: determining a value of a number of region identifiers, wherein the value of the number of region identifiers is constrained to being greater than zero; generating a bitstream based on the determining; and storing the bitstream in a non-transitory computer-readable recording medium.

A tenth aspect relates to a non-transitory computer-readable recording medium storing a bitstream of a video which is generated by a method performed by a video processing apparatus, wherein the method comprises: determining a value of a region identifier type (region_id_type), wherein the value of the region identifier type equal to zero specifies that region identifiers (IDs) are versatile video coding (VVC) subpicture IDs when a video codec used to code a main video track and a picture-in-picture (PiP) video track is VVC; and performing a conversion between a visual media data and a media data file based on the value of the region identifier type.

An eleventh aspect relates to a method for storing bitstream of a video, comprising: determining a value of a region identifier type (region_id_type), wherein the value of the region identifier type equal to zero specifies that region identifiers (IDs) are versatile video coding (VVC) subpicture IDs when a video codec used to code a main video track and a picture-in-picture (PiP) video track is VVC; generating a bitstream based on the determining; and storing the bitstream in a non-transitory computer-readable recording medium.

A twelfth aspect relates to a method, apparatus, or system described in the present disclosure.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a flowchart for an example method of processing video data according to an embodiment of the present disclosure.

FIG. 4 is a flowchart for an example method of processing video data according to an embodiment of the present disclosure.

FIG. 5 is a flowchart for an example method of processing video data according to an embodiment of the present disclosure.

FIG. 9 is a schematic diagram of an example encoder.

DETAILED DESCRIPTION

Figure 1:
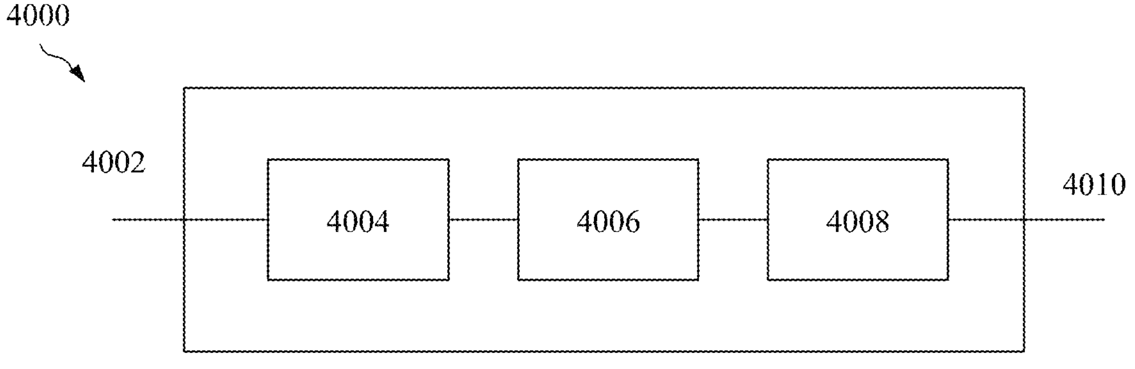
FIG. 1 is a block diagram showing an example video processing system.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, H.266 terminology is used in some description only for case of understanding and not for limiting scope of the disclosed techniques. As such, the techniques described herein are applicable to other video codec protocols and designs also. In the present disclosure, editing changes are shown to text by italics indicating cancelled text and bold underline indicating added text, with respect to a draft of the VVC specification or ISOBMFF file format specification.

1. Initial Discussion

This disclosure is related to media file formats. Specifically, it is related to signaling of picture-in-picture services in media files. The mechanisms may be applied individually or in various combinations, for media file formats, for example based on the International Organization for Standardization (ISO) base media file format (ISOBMFF) or its extensions and/or carriage of network abstraction layer (NAL) unit structured video in the ISOBMFF.

2. Video Coding Introduction

2.1 Video Coding Standards

Video coding standards have evolved primarily through the development of the International Telecommunication Union (ITU) telecommunication standardization sector (ITU-T) and ISO/International Electrotechnical Commission (IEC) standards. The ITU-T produced H.261 and H.263, ISO/IEC produced Motion picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly. Many methods have been adopted by JVET and put into the reference software named Joint Exploration Model (JEM) [2]. The JVET was renamed to be the Joint Video Experts Team (JVET) when the Versatile Video Coding (VVC) project officially started. VVC [3] is a coding standard, targeting at 50% bitrate reduction as compared to HEVC.

The Versatile Video Coding (VVC) standard (ITU-T H.266|ISO/IEC 23090-3) [3][4] and the associated Versatile Supplemental Enhancement Information (VSEI) standard (ITU-T H.274|ISO/IEC 23002-7) [5][6] is designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard under development by MPEG.

2.2 File Format Standards

Media streaming applications are based on the Internet Protocol (IP), Transmission Control Protocol (TCP), and Hypertext Transfer Protocol (HTTP) transport methods, and rely on a file format such as the ISO base media file format (ISOBMFF) [7]. One such streaming system is dynamic adaptive streaming over HTTP (DASH) [8]. For using a video format with ISOBMFF and DASH, a file format specification specific to the video format, such as the AVC file format and the HEVC file format in [9], would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format in [10], would be needed.

2.3 Transformation of Video Images for Presentation in ISOBMFF

In the ISOBMFF, the movie header box and the track header box includes the matrix field as follows:

```
template int(32)[9] matrix =
   {0x00010000, 0, 0, 0, 0x00010000, 0, 0, 0, 0x40000000};
   // Unity matrix
```

These matrix values specify a transformation of video images for presentation. Not all derived specifications use matrices. If a matrix is not used, the matrix shall be set to the identity matrix. If a matrix is used, the point (p,q) is transformed into (p',q') using the matrix as follows:

$$(p\ q\ 1) * \begin{vmatrix} a & b & u \\ c & d & v \\ x & y & w \end{vmatrix} = (m\ n\ z)$$

$$m = ap + cq + x;\ n = bp + dq + y;\ z = up + vq + w;$$

$$p' = m/z;\ q' = n/z$$

The coordinates {p,q} are on the decompressed frame, and {p',q'} are at the rendering output. Therefore, for example, the matrix {2, 0, 0, 0, 2, 0, 0, 0, 1} exactly doubles the pixel dimension of an image. The coordinates transformed by the matrix may be not normalized, and the coordinates represent actual sample locations. Therefore {x,y} can, for example, be considered a translation vector for the image. The coordinate origin is located at the upper left corner, X values increase to the right, and Y values increase downwards. {p,q} and {p',q'} may be taken as absolute pixel locations relative to the upper left hand corner of the original image (after scaling to the size determined by the track header's width and height) and the transformed (rendering) surface, respectively.

Each track is composed using a corresponding matrix as specified into an overall image. The result is then transformed and composed according to the matrix at the movie level in the MovieHeaderBox. Whether the resulting image is clipped to eliminate pixels is application-dependent. Such eliminated pixels are not displayed to a vertical rectangular region within a window, for example. So, for example, when only one video track is displayed, the video track has a translation to {20,30}, and a unity matrix is in the MovieHeaderBox, an application may choose not to display the empty L shaped region between the image and the origin. All the values in a matrix are stored as 16.16 fixed-point values, except for u, v and w, which are stored as 2.30 fixed-point values. The values in the matrix are stored in the order {a, b, u, c, d, v, x, y, w}.

2.4 Processing of the Pixel Data in ISOBMFF

The processing of the pixel data from the output of the decoder to rendering of the pixel data on the screen may not be a conformance point of ISOBMFF. However, several structures enable signaling of such rendering features. Conformance is based on the following assumptions.

First, under the 'iso3' brand or brands that share corresponding requirements, the TrackHeaderBox width and height are set by assuming that the rendered pixels are square, such that the pixel aspect ratio is 1:1. For other brands, the use of the associated structure for rendering is undetermined.

Second, the VisualSampleEntry documents the expected size of the pixel buffer needed to receive the codec output. The expected size may be cropped by in-stream structures. For example, when a video codec works only with multiples of 16 pixels per line or column, when the width and height of the video fed to the encoder is 1000×500, the encoder will typically internally use 64×32 blocs of pixels. However, the encoder is expected to use codec-specific cropping structures that are not exposed at the ISOBMFF level to output a 1000×500 video. The width and height of the VisualSampleEntry fields in this case may be 1000×500.

Third, the PixelAspectRatioBox documents the aspect ratio that should be applied to the pixels output by the decoder, but does not imply corresponding adjustments. The associated adjustment(s) should be taken care of by setting scaled values in the TrackHeaderBox. For example, when the pixels are scaled horizontally by a factor of ½ prior to the encoder, the inverse scaling should be applied at the output of the decoder to present non-distorted videos. This is done by setting the TrackHeaderBox height equal to the VisualSampleEntry height and the TrackHeaderBox width equal to double of the VisualSampleEntry width. Additionally, a PixelAspectRatioBox with a hSpacing double or more than a corresponding vSpacing field may be used when in-stream structures do not carry such information.

Fourth, a CleanApertureBox may be provided to further crop the video.

The processing of the decoded pixel is assumed to be as follows. Any cropping documented by a CleanApertureBox is applied on the pixels output by the decoder. When a CleanApertureBox is present, the cropped image is then scaled horizontally by the factor TrackHeaderBox.width/CleanAperture.width and vertically by TrackHeaderBox.height/CleanAperture.height. Otherwise, when a CleanApertureBox is not present, the decoded image is then scaled horizontally by the factor TrackHeaderBox.width/SampleEntry.width and vertically by TrackHeaderBox.height/SampleEntry.height. This operation may be referred to as normalization to track dimensions. The TrackHeaderBox matrix is then applied. All visual tracks are superposed in increasing order of the TrackHeaderBox.layer value. The MovieHeaderBox matrix is then applied to the composition. This is an example processing model and concrete implementations following this model should avoid resampling the image, in particular when the combination of the above operations results in the identity transformation.

2.5 Track Grouping and Entity Grouping

The ISOBMFF specifies both track grouping and entity grouping. Track grouping is signalled based on the track group box that is contained in the track box. Accordingly, track grouping is a track-level signaling. This track group box allows for indication of groups of tracks, where each group shares a particular characteristic or the tracks within a group have a particular relationship. The particular characteristic or the relationship is indicated by the box type of the boxes contained in the track group box. The boxes contained in the track group box include an identifier (ID), which can be used to conclude the tracks belong to the same track group. The tracks that contain the same type of a contained box within the track group box and have the same identifier value within these contained boxes belong to the same track group.

An entity group is a grouping of items, which may also group tracks. The entities in an entity group share a particular characteristic or have a particular relationship as indicated by the grouping type. Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in a GroupsListBox of a track-level MetaBox refer to track-level items of that track. GroupsListBox contains EntityToGroupBoxes each specifying one entity group. The GroupsListBox includes the entity groups specified for the file. This box contains a set of full boxes, each called an EntityToGroupBox, with four-character codes denoting a defined grouping type. When GroupsListBox is present in a file-level MetaBox there shall be no item_ID value in ItemInfoBox in any file-level MetaBox that is equal to the track_ID value in any TrackHeaderBox.

2.6 Picture-In-Picture Signaling in ISOBMFF

Picture-in-picture services offer the ability to include a picture with a small resolution within a picture with a bigger resolution. Such a service may be beneficial to show two videos to a user at the same time, whereby the video with bigger resolution is considered as the main video and the video with a smaller resolution is considered as the supplementary video. Such a picture-in-picture service can be used to offer accessibility services where the main video is supplemented by a signage video. A design for picture-in-picture signaling in the ISOBMFF is included in [11]. The design is as follows.

2.6.1 Picture in Picture Sample Group

2.6.1.1 Definition

Picture-in-picture (PiP) services offer the ability to include a video with a smaller spatial resolution within a video with a bigger spatial resolution, referred to as the PiP video and the main video, respectively. A video track containing a 'subt' track reference indicates that the track contains PiP video and the main video is contained in the referenced track or any track in the alternate group to which the referenced track belongs, if any. For each pair of PiP video and main video, the window in the main video for embedding/overlaying the PiP video, which is smaller in size than the main video, is indicated by the values of the matrix fields of the TrackHeaderBoxes of the PiP video track and the main video track, and the value of the layer field of the TrackHeaderBox of the supplementary video track is required to be less than that of the main video track, to layer the PiP video in front of the main video. When PicInPicInfoEntry is present in a PiP video track it indicates that the coded video data units representing the target PiP region in the main video can be replaced with the corresponding coded video data units of the PiP video. In this case, it is required that the same video codec is used for coding of the PiP video and the main video. The absence of this sample group indicates that it is unknown whether such replacement is possible.

2.6.1.2 Syntax

```
class PicInPicInfoEntry( ) extends VisualSampleGroupEntry ('pinp') {
  unsigned int(8) region_id_type;
  unsigned int(8) num_region_ids;
  for(i = 0; i < num_region_ids; i++)
    unsigned int(16) region_id[i];
}
```

2.6.1.3 Semantics

When PicInPicInfoEntry is present, the player may choose to replace the coded video data units representing the target PiP region in the main video with the corresponding coded video data units of the PiP video before sending to the video decoder for decoding. In this case, for a particular picture in the main video, the corresponding video data units of the PiP video are all the coded video data units in the decoding-time-synchronized sample in the PiP video track.

region_id_type indicates the type for the value taken by the region_id. When region_id_type is equal to 0, the region IDs are VVC subpicture IDs. When region_id_type is equal to 1, the region IDs are the groupID value in the NAL unit map sample group for the NAL units that may be replaced by the NAL units of the PiP track. region_id_type values greater than 1 are reserved. num_region_ids specifies the number of the following region_id[i] fields. region_id[i] specifies the i-th ID for the coded video data units representing the target picture-in-picture region. When region_id_type is equal to 1, the main video track shall have a 'nalm' sample group with grouping_type_parameter equal to 'pinp' indicating the NAL units in the main track that may be replaced by the NAL units in the PiP track with the same groupID values. When region_id_type is equal to 1 and num_region_ids is equal to 1, 'nalm' sample group shall not be present in the PiP track and all the NAL units of the PIP track are implicitly considered to have groupID equal to region_id[0]. When region_id_type is equal to 1 and num_region_ids is greater than 1, a 'nalm' sample group with grouping_type_parameter equal to 'pinp' shall be present in the PiP track and provide a mapping of groupID values to NAL units.

3. Technical Problems Solved by Disclosed Technical Solutions

An example design for signaling of picture-in-picture in an ISOBMFF-based media file has the following problems. First, the region identifier (region_id) type (region_id_type) field is coded using 8 bits. However, less than 8 bits would be sufficient. Second, the value of number of region IDs (num_region_ids) is allowed to be equal to 0. However, a value 0 of num_region_ids is not meaningful. Third, the specification specifies that when region ID type (region_id_type) is equal to 0 the region IDs are VVC subpicture IDs. However, this would disallow the use of region_id_type equal to 0 for other video codecs that support coding of regions like VVC subpictures.

4. A Listing of Solutions and Embodiments

To solve the above-described problem, methods as summarized below are disclosed. The embodiments should be considered as examples to explain the general concepts and should not be interpreted in a narrow way. Furthermore, these embodiments can be applied individually or combined in any manner.

Example 1

To solve the first problem, the region_id_type field may be coded using less than 8 bits. For example, the region_id_type field may be coded using 2, 3, or 4 bits, and the rest of the 8 bits can be reserved for further use in a backward compatible manner.

Example 2

To solve the second problem, the specification may specify that the value of num_region_ids shall be greater than 0. In another example, the name of the field num_region_ids can be changed to be number of region IDs minus one (num_region_ids_minus1). Furthermore, the specification may specify that num_region_ids_minus1 plus 1 specifies the number of the following region ID region_id[i] fields, and the loop "for (i=0; i<num_region_ids; i++)" is changed to be "for (i=0; i<=num_region_ids_minus1; i++)".

Example 3

To solve the third problem, the specification may specify that when the video codec used for the main video track is VVC, as denoted by a sample entry type equal to 'vve1', 'vvi1', or 'vvs1', the video codec used for the picture-in-picture (PiP) video track is also VVC and the value of region_id_type equal to 0 specifies that the region IDs are VVC subpicture IDs. Furthermore, the specification may specify that when the video codec used for the main video track is not VVC, the video codec used for the PiP video track is also not VVC and the value of region_id_type equal to 0 is reserved.

5. Embodiments

Below are some example embodiments for all the disclosure items and most of their subitems summarized above. Most relevant parts that have been added or modified are shown in underlined bold font, and some of the deleted parts are shown in italicized bold fonts. There may be some other changes that are editorial in nature and thus not noted. Parts that remain unchanged are not included.

5.1.1 Picture in Picture Sample Group

5.1.1.1 Definition

Picture-in-picture (PiP) services offer the ability to include a video with a smaller spatial resolution within a video with a bigger spatial resolution, referred to as the PiP video and the main video, respectively. A video track containing a 'subt' track reference indicates that the track contains PiP video and the main video is contained in the referenced track or any track in the alternate group to which the referenced track belongs, if any. For each pair of PiP video and main video, the window in the main video for embedding/overlaying the PiP video, which is smaller in size than the main video, is indicated by the values of the matrix fields of the TrackHeaderBoxes of the PiP video track and the main video track, and the value of the layer field of the TrackHeaderBox of the supplementary video track is required to be less than that of the main video track, to layer the PiP video in front of the main video. When PicInPicInfoEntry is present in a PiP video track it indicates that the coded video data units representing the target PiP region in the main video can be replaced with the corresponding coded video data units of the PiP video. In this case, it is required that the same video codec is used for coding of the PiP video and the main video. The absence of this sample group indicates that it is unknown whether such replacement is possible.

5.1.1.2 Syntax

```
class PicInPicInfoEntry( ) extends VisualSampleGroupEntry ('pinp') {
  bit(5) reserved = '11111'b;
  unsigned int(3)(8) region_id_type;
  unsigned int(8) num_region_ids_minus1;
  for(i = 0; i <= num_region_ids_minus1; i++)
    unsigned int(16) region_id[i];
}
```

Semantics

When PicInPicInfoEntry is present, the player may choose to replace the coded video data units representing the target PiP region in the main video with the corresponding coded video data units of the PiP video before sending to the video decoder for decoding. In this case, for a particular picture in the main video, the corresponding video data units of the PiP video are all the coded video data units in the decoding-time-synchronized sample in the PiP video track. region_id_type indicates the type for the value taken by the region_id.

If the video codec used for the main video track is VVC (i.e., the sample entry type is 'vvc1', 'vvi1', or 'vvs1'), in which case the video codec used for the PiP video track is also VVC, region_id_type equal to 0 specifies that the region IDs are VVC subpicture IDs. Otherwise, the value of region_id_type equal to 0 is reserved. When region_id_type is equal to 0, the region IDs are VVC subpicture IDs.

When region_id_type is equal to 1, the region IDs are the groupID value in the NAL unit map sample group for the NAL units that may be replaced by the NAL units of the PiP track. region_id_type values greater than 1 are reserved. num_region_ids_minus1 plus 1 specifies the number of the following region_id[i] fields. region_id[i] specifies the i-th ID for the coded video data units representing the target picture-in-picture region. When region_id_type is equal to 1, the main video track shall have a 'nalm' sample group with grouping_type_parameter equal to 'pinp' indicating the NAL units in the main track that may be replaced by the NAL units in the PiP track with the same groupID values. When region_id_type is equal to 1 and num_region_ids is equal to 1, 'nalm' sample group shall not be present in the PiP track and all the NAL units of the PIP track are implicitly considered to have groupID equal to region_id[0]. When region_id_type is equal to 1 and num_region_ids is greater than 1, a 'nalm' sample group with grouping_type_parameter equal to 'pinp' shall be present in the PiP track and provide a mapping of groupID values to NAL units.

6. References

[1] ITU-T and ISO/IEC, "High efficiency video coding", Rec. ITU-T H.265| ISO/IEC 23008-2 (in force edition).

[2] J. Chen, E. Alshina, G. J. Sullivan, J.-R. Ohm, J. Boyce, "Algorithm description of Joint Exploration Test Model 7 (JEM7)," JVET-G1001, August 2017.

[3] Rec. ITU-T H.266| ISO/IEC 23090-3, "Versatile Video Coding", 2020.

[4] B. Bross, J. Chen, S. Liu, Y.-K. Wang (editors), "Versatile Video Coding (Draft 10)," JVET-S2001.

[5] Rec. ITU-T Rec. H.274| ISO/IEC 23002-7, "Versatile Supplemental Enhancement Information Messages for Coded Video Bitstreams", 2020.

[6] J. Boyce, V. Drugeon, G. J. Sullivan, Y.-K. Wang (editors), "Versatile supplemental enhancement information messages for coded video bitstreams (Draft 5)," JVET-S2007.

[7] ISO/IEC 14496-12: "Information technology—Coding of audio-visual objects-Part 12: ISO base media file format".

[8] ISO/IEC 23009-1: "Information technology—Dynamic adaptive streaming over HTTP (DASH)—Part 1: Media presentation description and segment formats". The 4th edition text of the DASH standard specification can be found in MPEG input document m52458.

[9] ISO/IEC 14496-15: "Information technology—Coding of audio-visual objects—Part 15: Carriage of network abstraction layer (NAL) unit structured video in the ISO base media file format".

ISO/IEC 23008-12: "Information technology-High efficiency coding and media delivery in heterogeneous environments—Part 12: Image File Format".

K. K. Sreedhar, M. M. Hannuksela, Lukasz Kondrad, and Lauri Ilola, "On picture-in-picture signalling in ISOBMFF", MPEG input document m59497, April 2022.

FIG. 1 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
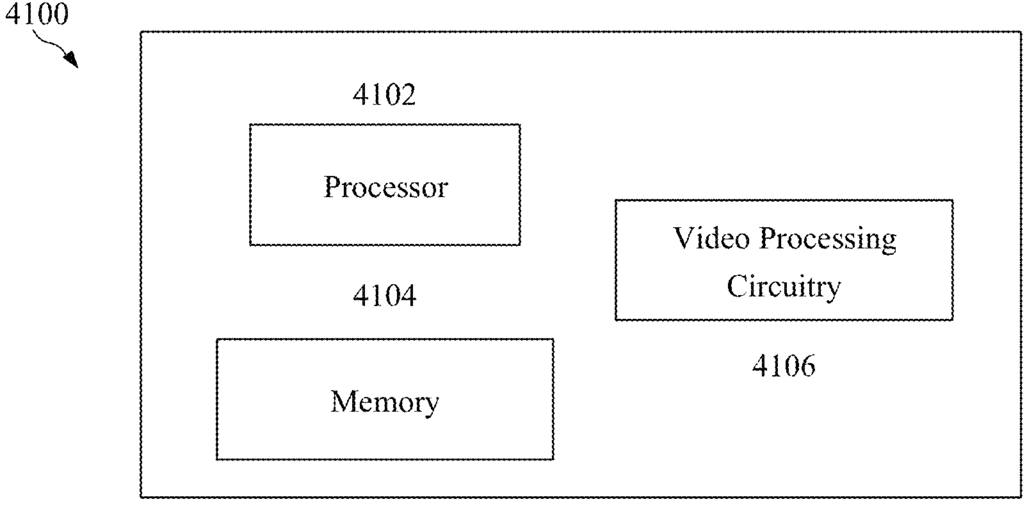
FIG. 2 is a block diagram of an example video processing apparatus.

FIG. 2 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

FIG. 3 is a flowchart for an example method 4200 of processing video data. In block 4202, the method 4200 includes determining a value of a region identifier (ID) type (region_id_type) in a region identifier (ID) type field. The value of the region ID type is coded in the region ID type field using four or less bits. For example, the region ID may be coded in four bits, three bits, two bits, or one bit. In block 4204, the method 4200 includes performing a conversion between a visual media data and a media data file based on the value of the region ID type in the region ID type field. The conversion of step 4204 may include encoding at an encoder or decoding at a decoder, depending on the example.

In an embodiment, a remaining group of four or more bits in the region ID type field is reserved. In an embodiment, the region ID type equal to zero specifies that region IDs are versatile video coding (VVC) subpicture IDs. In an embodiment, the region ID type indicates a type for a value taken by a region ID. In an embodiment, the region ID is used for signaling of picture-in-picture in International Organization for Standardization base media file format (ISOBMFF). In an embodiment, the media data file comprises an International Organization for Standardization base media file format (ISOBMFF).

FIG. 4 is a flowchart for an example method 4220 of processing video data. In block 4222, the method 4220 includes determining a value of a number of region identifiers, wherein the value of the number of region identifiers is constrained to being greater than zero. In block 4224, the method 4220 includes performing a conversion between a visual media data and a media data file based on the value of the number of region identifiers. The conversion of step 4224 may include encoding at an encoder or decoding at a decoder, depending on the example.

In an embodiment, the number of region identifiers is expressed as a number of region identifiers minus one (num_region_ids_minus1). In an embodiment, the num_region_ids_minus1 plus one specifies a region identifier (region_id[i]). In an embodiment, the region identifier specifies an i-th ID for coded video data units representing a target picture-in-picture region. In an embodiment, the region identifier is determined according to a loop specified by for (i=0; i<=num_region_ids_minus1; i++). In an embodiment, the number of region identifiers is expressed as num_region_ids. In an embodiment, the number of region identifiers is expressed as num_region_ids_minus1.

FIG. 5 is a flowchart for an example method 4240 of processing video data. In block 4242, the method 4240 includes determining a value of a region identifier type (region_id_type). The value of the region identifier type equal to zero specifies that region identifiers (IDs) are versatile video coding (VVC) subpicture IDs when a video codec used to code a main video track and a picture-in-picture (PiP) video track is VVC. In block 4244, the method 4240 includes performing a conversion between a visual media data and a media data file based on the value of the region identifier type. The conversion of step 4244 may include encoding at an encoder or decoding at a decoder, depending on the example.

In an embodiment, the value of the region ID type equal to zero is reserved when a video codec for a main video track is not VVC. In an embodiment, the value of the region ID type equal to zero is reserved when a video codec used to code a main video track and a picture-in-picture video track is not VVC. In an embodiment, a sample entry type is vvc1, vvi1, or vvs1 when a video codec used for a main video track is VVC.

It should be noted that the methods 4200, 4220, and 4240 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 6:
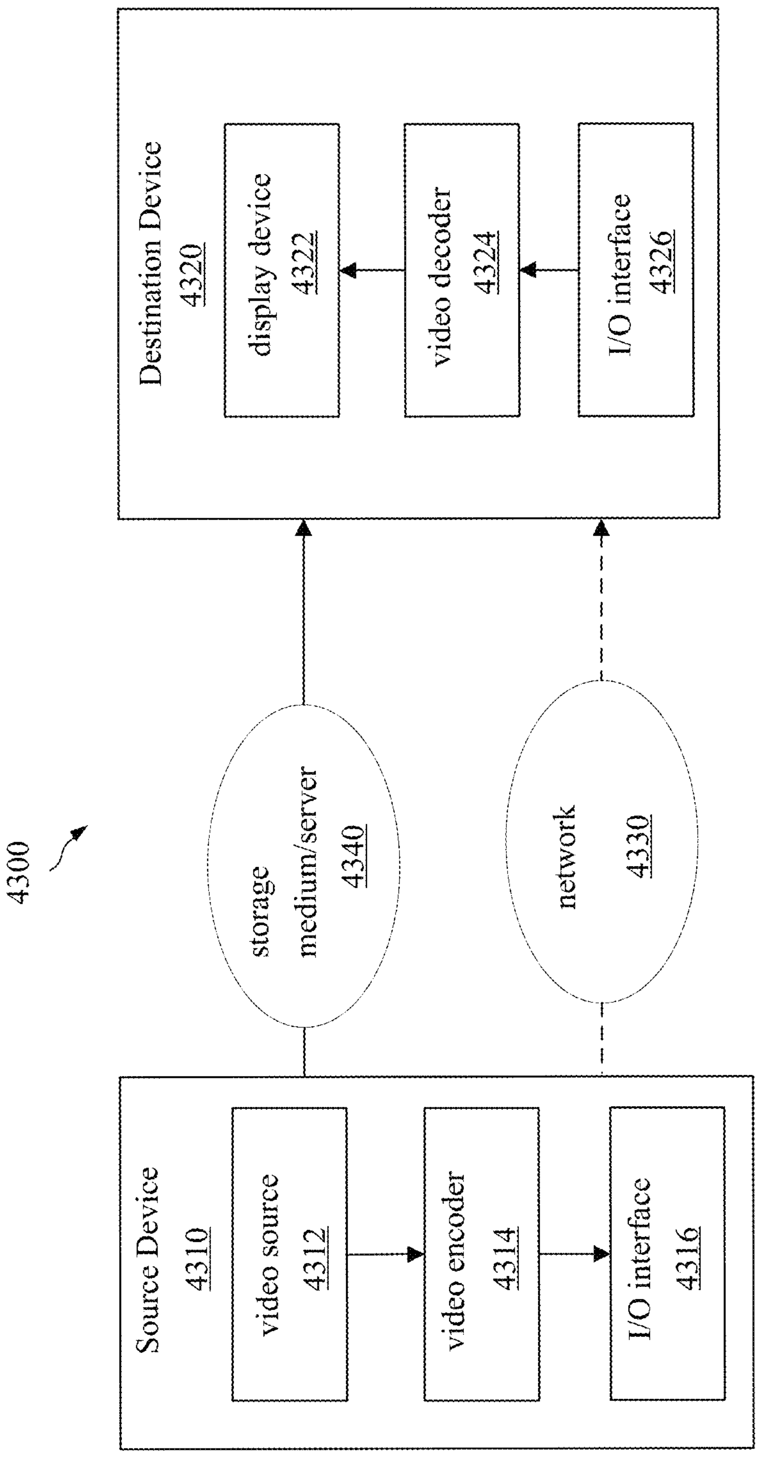
FIG. 6 is a block diagram that illustrates an example video coding system.

FIG. 6 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 7:
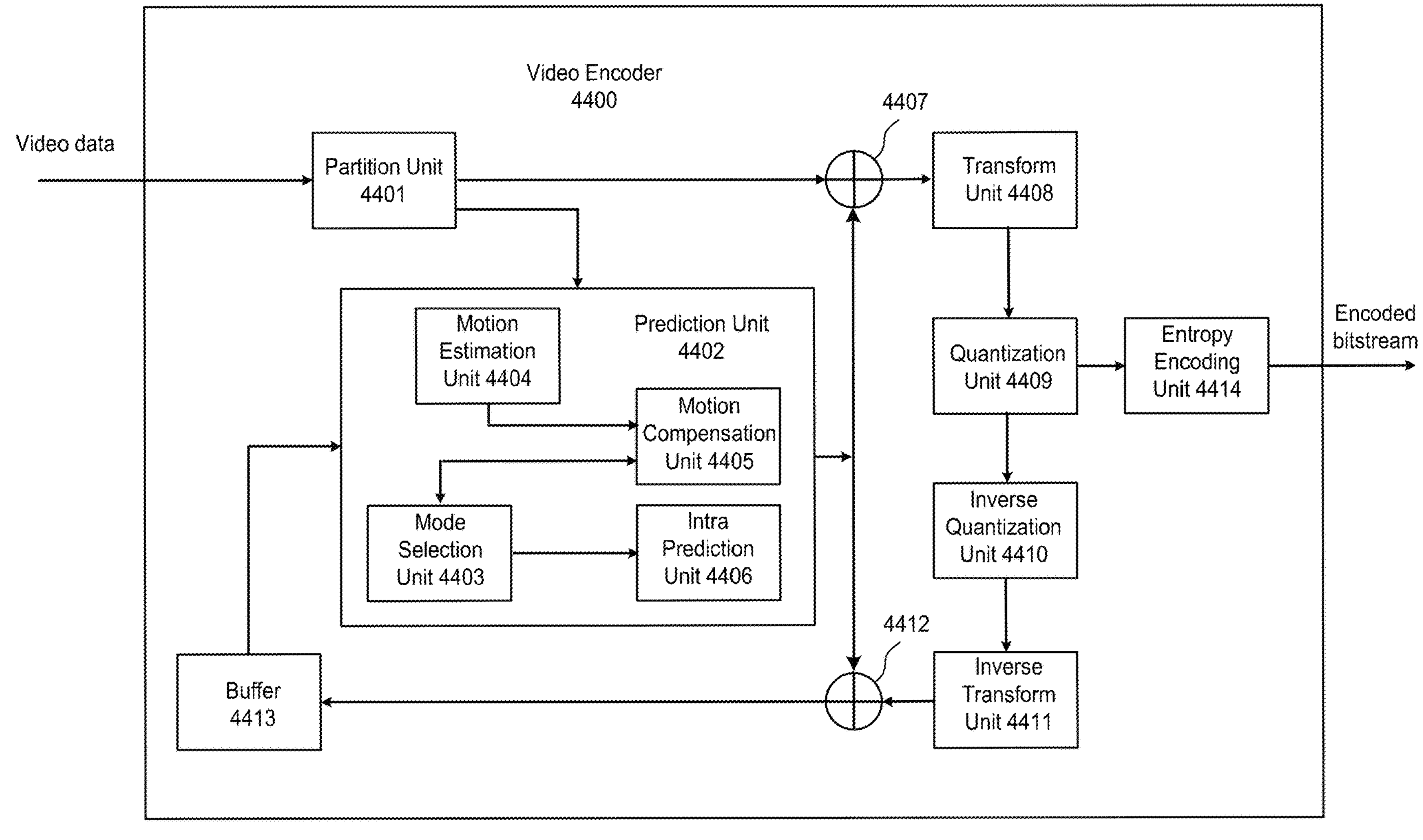
FIG. 7 is a block diagram that illustrates an example encoder.

FIG. 7 is a block diagram illustrating an example of video encoder 4400, which may be video encoder 4314 in the system 4300 illustrated in FIG. 4. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 8:
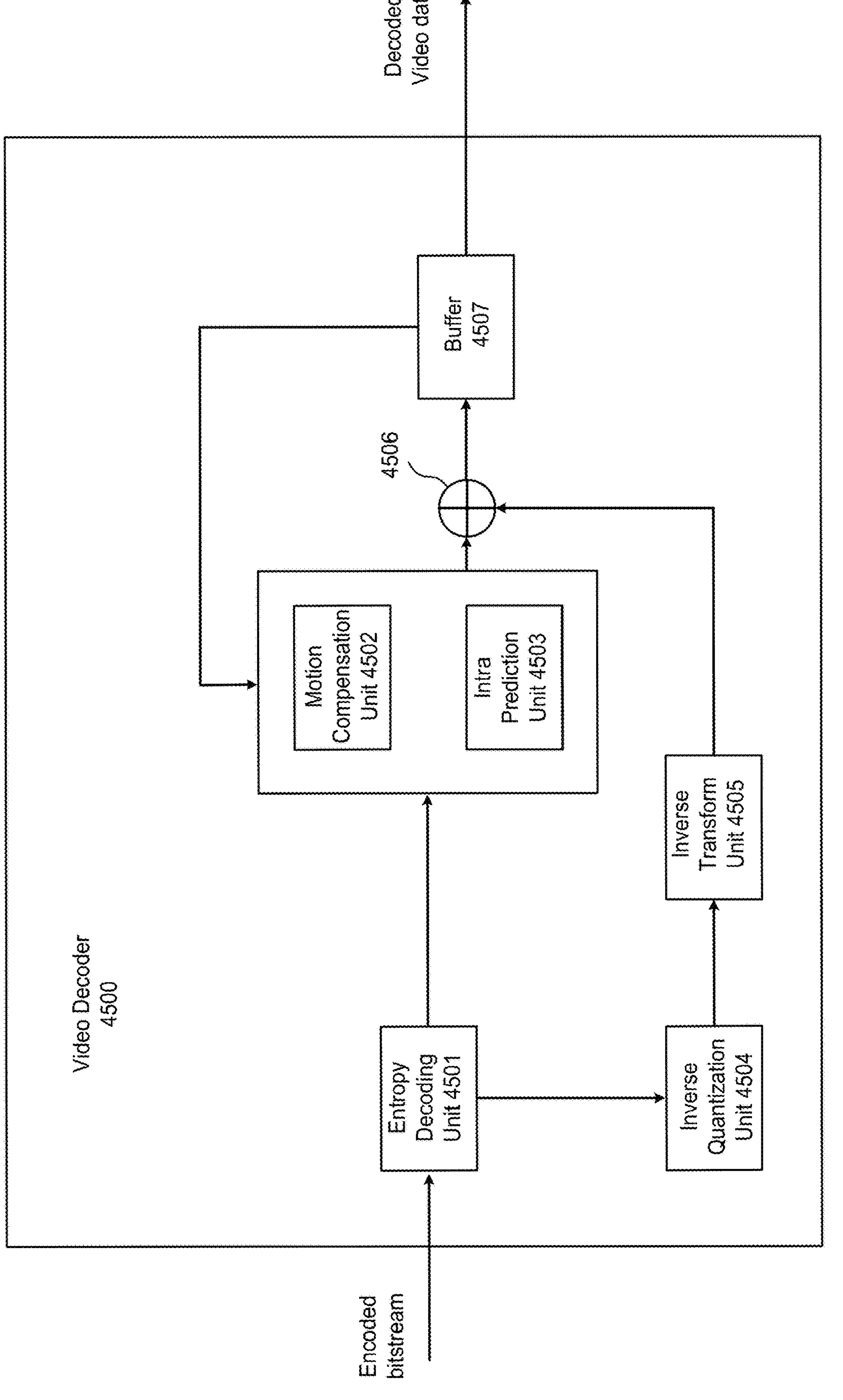
FIG. 8 is a block diagram that illustrates an example decoder.

FIG. 8 is a block diagram illustrating an example of video decoder 4500 which may be video decoder 4324 in the system 4300 illustrated in FIG. 4. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

FIG. 9 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

The following solutions show example embodiments of techniques discussed in the previous section (e.g., item 1).

1. A method for processing video data (e.g., method 4200 depicted in FIG. 3) comprising: determining (4202) a value of a region identifier (ID) type (region_id_type) field, wherein the region_id_type field coded using four or less bits; and performing (4204) a conversion between a visual media data and a media data file based on the value of the region_id_type field.
2. The method of solution 1, wherein a remaining group of four or more bits associated with the region_id_type field are reserved.

The following solutions show example embodiments of techniques discussed in the previous section (e.g., item 2).

3. A method for processing video data comprising: determining a value of a number of region identifiers (num_region_ids) field, wherein the num_region_ids field is restricted to be greater than zero; and a conversion between a visual media data and a media data file based on the value of the num_region_ids field.
4. The method of any of solutions 1-3, wherein num_region_ids field is expressed as a num_region_ids minus one (num_region_ids_minus1) field.
5. The method of any of solutions 1-4, wherein the num_region_ids_minus1 field plus one specifies a number of region identifier fields (region_id[i]).
6. The method of any of solutions 1-5, wherein the region_id[i] is determined according to a loop specified by for (i=0; i<=num_region_ids_minus1; i++).

The following solutions show example embodiments of techniques discussed in the previous section (e.g., item 3).

7. A method for processing video data comprising: determining a value of a region identifier type (region_id_type) field, wherein the region_id_type field is equal to zero to specify that region identifiers (IDs) are versatile video coding (VVC) subpicture IDs when a VVC codec is used to code a video main track; and performing a conversion between a visual media data and a media data file based on the value of the region_id_type field.
8. The method of any of solutions 1-7, wherein a sample entry type is set to vvc1, vvi1, or vvs1 when the VVC codec is used to code the video main track.
9. The method of any of solutions 1-8, wherein a value of zero for the region_id_type field is reserved when the VVC codec is not used to code the video main track and when the VVC codec is not used to code a picture-in-picture (PiP) video track.
10. An apparatus for processing video data comprising: a processor; and a non-transitory memory with instructions thereon, wherein the instructions upon execution by the processor, cause the processor to perform the method of any of solutions 1-9.
11. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-9.
12. A non-transitory computer-readable recording medium storing a bitstream of a video which is generated by a method performed by a video processing apparatus, wherein the method comprises: determining a value of a region identifier (ID) type (region_id_type) field, wherein the region_id_type field coded using four or less bits; and generating a bitstream based on the determining.
13. A method for storing bitstream of a video comprising: determining a value of a region identifier (ID) type (region_id_type) field, wherein the region_id_type field coded using four or less bits; generating a bitstream based on the determining; and storing the bitstream in a non-transitory computer-readable recording medium.
14. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing visual media data, comprising:

determining a type for a value taken by a region identifier based on a first syntax element, wherein the first syntax element is coded using four or less bits; and performing a conversion between the visual media data and a media data file based on the type for the value taken by the region identifier.

2. The method of claim 1, wherein the first syntax element is coded using an unsigned integer with three bits, and five bits are reserved before the first syntax element.

3. The method of claim 1, wherein when a video codec used for a main video track is versatile video coding (VVC), the first syntax element equal to zero specifies that region identifiers are VVC subpicture identifiers.

4. The method of claim 1, wherein when a video codec used for a main video track is not versatile video coding (VVC), a value of the first syntax element equal to zero is reserved.

5. The method of claim 1, wherein the region identifier is used for signaling of picture-in-picture in International Organization for Standardization base media file format (ISOBMFF).

6. The method of claim 1, wherein the media data file is based on an International Organization for Standardization base media file format (ISOBMFF).

7. The method of claim 1, further comprising:

determining a number of region identifiers based on a second syntax element, wherein a value of the second syntax element plus one indicates the number of region identifiers; and performing the conversion based on the number of region identifiers.

8. The method of claim 7, wherein the second syntax element is coded using an unsigned integer with eight bits, and the number of region identifiers is constrained to be greater than 0.

9. The method of claim 1, wherein the region identifier specifies an i-th identifier for network abstraction layer (NAL) units representing a target picture region.

10. The method of claim 7, wherein the region identifier is determined according to a loop specified by "for (i=0; i<=num_region_ids_minus1; i++)", where num_region_ids_minus1 is the second syntax element.

11. The method of claim 3, wherein when the video codec used for the main video track is VVC, a sample entry type is 'vvc1' or 'vvi1', and a video codec used for a supplementary video track is also VVC.

12. The method of claim 1, wherein the conversion comprises generating the media data file from the visual media data.

13. The method of claim 1, wherein the conversion comprises parsing the media data file into the visual media data.

14. An apparatus for processing video data comprising: a processor; and a non-transitory memory with instructions thereon, wherein the instructions upon execution by the processor, cause the processor to:

determine a type for a value taken by a region identifier based on a first syntax element, wherein the first syntax element is coded using four or less bits; and perform a conversion between a visual media data and a media data file based on the type for the value taken by the region identifier.

15. The apparatus of claim 14, wherein the first syntax element is coded using an unsigned integer with three bits, and five bits are reserved before the first syntax element.

16. The apparatus of claim 14, wherein when a video codec used for a main video track is versatile video coding (VVC), the first syntax element equal to zero specifies that region identifiers are VVC subpicture identifiers; and when the video codec used for the main video track is not VVC, a value of the first syntax element equal to zero is reserved.

17. A non-transitory computer-readable storage medium storing instructions that cause a processor to:

determine a type for a value taken by a region identifier based on a first syntax element, wherein the first syntax element is coded using four or less bits; and perform a conversion between a visual media data and a media data file based on the type for the value taken by the region identifier.

18. The non-transitory computer-readable storage medium of claim 17, wherein the first syntax element is coded using an unsigned integer with three bits, and five bits are reserved before the first syntax element, when a video codec used for a main video track is versatile video coding (VVC), the first syntax element equal to zero specifies that region identifiers are VVC subpicture identifiers; and when the video codec used for the main video track is not VVC, a value of the first syntax element equal to zero is reserved.

19. A method for storing a media data file of media data, comprising:

determining a type for a value taken by a region identifier based on a first syntax element, wherein the first syntax element is coded using four or less bits;

generating the media data file based on the type for the value taken by the region identifier; and storing the media data file in a non-transitory computer-readable recording medium.

20. The method of claim 19, wherein the first syntax element is coded using an unsigned integer with three bits, and five bits are reserved before the first syntax element, when a video codec used for a main video track is versatile video coding (VVC), the first syntax element equal to zero specifies that region identifiers are VVC subpicture identifiers; and when the video codec used for the main video track is not VVC, a value of the first syntax element equal to zero is reserved.

* * * * *